United States Patent [19]

Schaeffer

[11] 4,190,779
[45] Feb. 26, 1980

[54] STEP MOTORS

[76] Inventor: Ernest Schaeffer, 6234 Kent Land Ave., Woodland Hills, Calif. 91364

[21] Appl. No.: 799,302

[22] Filed: May 23, 1977

Related U.S. Application Data

[63] Continuation-in-part of Ser. No. 683,180, May 4, 1976, abandoned.

[51] Int. Cl.² .......................................... H02K 41/02
[52] U.S. Cl. .................................. 310/12; 310/49 R; 310/156
[58] Field of Search ...................... 310/49, 156, 12–14, 310/162–165

[56] References Cited

U.S. PATENT DOCUMENTS

| | | | |
|---|---|---|---|
| 2,059,518 | 11/1936 | Harley | 310/156 |
| 3,344,325 | 9/1967 | Sklaroff | 310/49 X |
| 3,411,059 | 11/1968 | Kaiwa | 310/49 X |
| 3,466,518 | 9/1969 | Aylicki et al. | 310/49 X |
| 3,502,914 | 3/1970 | Cox | 310/49 X |
| 3,588,888 | 6/1971 | Harden | 310/49 X |
| 3,978,356 | 8/1976 | Spiesberger | 310/49 X |
| 4,031,419 | 6/1977 | Spiesberger | 310/49 |

*Primary Examiner*—Donoven F. Duggan
*Attorney, Agent, or Firm*—Blakely, Sokoloff, Taylor & Zafman

[57] ABSTRACT

Improved step motors for providing linear and angular step-wise motion. In certain embodiments the motors utilize a permanent magnet rotor having a multiplicity of equal pitch (equally spaced) permanent magnetic poles of alternating polarity. The stator has a plurality of pole groups, each pole group having a plurality of poles of the same pitch or spacing as the rotor poles, with each stator pole group being displaced with respect to the other stator pole groups, whereby the poles in the pole groups will successively align with the poles in the rotor in a predetermined sequence upon relative rotation between the rotor and stator. Windings are provided on each stator pole group to selectively polarize the stator poles in the respective pole group in alternate polarity to encourage alignment of the nearest rotor poles therewith. Linear and rotary devices are disclosed. Permanent magnet embodiments disclosed include multiple permanent magnets making up the rotor poles, and a single permanent magnets having shaped pole pieces. A wound rotor embodiment is also disclosed.

31 Claims, 15 Drawing Figures

STEP MOTORS

This application is a continuation-in-part application of patent application Ser. No. 683,180 filed May 4, 1976 now abandoned.

BACKGROUND OF THE INVENTION

1. Field of the Invention

The present invention relates to the field of electromechanical devices, and more particularly to stepper motors and the like.

2. Prior Art

Step motors, or as they are often called, stepper motors, are motors which are primarily characterized by their step-wise motion resulting from the sequential excitation thereof through the plurality of excitation states of the motor. Such devices characteristically provide a relatively high torque and limited and controllable motion, which is specifically desired in some applications. In recent years the interest in and the application of such devices has grossly expanded, as such devices are ideal in applications requiring closely controlled motion, often sought in automatic equipment, and have excitation and response characteristics easily interfaced with digital equipment to provide an electromechanical drive for computer control. Accordingly, various types of stepper motors are well known in the prior art.

One common type of stepper motor is referred to as a variable reluctance stepper motor, having a wound stator and a soft magnetic rotor. One specific configuration for such devices uses a plurality of wound stators separated axially along the axis of a multiple pole (salient pole) soft magnetic rotor, with the stators being rotated slightly, one with respect to the other, so that each stator may incrementally advance the rotor with respect to the previous stator. By way of specific example, for a configuration having three such stators, each stator would be rotated with respect to the other two by an angle equal to one-third of the pitch between adjacent rotor poles, so that sequentially cycling the excitation between the three stators will advance the rotor position by one rotor pole per excitation cycle. Such a configuration is relatively simple in conception and construction, and may be fabricated having substantially any reasonable number of phases. It has a disadvantage however, of providing a relatively long assembly because of the "stack" of wound stators about the single rotor, and accordingly is relatively heavy and bulky for the torque provided. Such motors are described in a book entitled "Theory and Applications of Step Motors" by Benjamin C. Kuo, a West Publishing Company publication (1974).

Another type of variable reluctance motor is described in U.S. Pat. No. 2,249,029. The motor described therein is similar to the motor described hereabove, though only a single wound stator is provided. The stator is divided into segments each having a plurality of poles, with alternate segments effectively representing alternate stators of the hereinbefore described variable reluctance stepper motor. Additional examples of such devices include the disclosures of U.S. Pat. Nos. 3,439,200; 3,535,604; and 3,509,392. Generally speaking, such devices use a single coil to excite all poles within a specific pole group, resulting in adjacent poles within the pole group having the same polarity.

Various types of linear variable reluctance motors are also known. Such devices may be fabricated by merely "flattening out" the pole configuration of a rotary variable reluctance motor at the air gap, and repeating the pole pattern over the particular length of drive required. An example of such a device includes that of U.S. Pat. No. 3,376,518. As shown in the foregoing patent, any such technique may also readily be extended to a second, typically an orthogonal, direction.

Further, variable reluctance motors utilizing some form of bias magnet, e.g., permanent magnet, are also known. By way of example, in the book hereinbefore referred to, a device identified as the CYCLONOME step motor is described wherein a control coil controls the flux pattern of a permanent magnet in such a way as to controllably advance the rotor as a result thereof. Similarly, in U.S. Pat. No. 3,457,482, a permanent magnet is utilized as a bias magnet, with control windings controlling the permanent magnet flux path at the pole faces adjacent the soft magnetic rotor. In these devices it is important to note that the permanent magnets are used as bias magnets, with the control windings being provided on the same magnetic element, e.g., the bias magnets as well as the windings form the "stator", operating in conjunction with a salient pole soft magnetic "rotor".

In addition to the foregoing devices, permanent magnet stepper motors are also well known. One type of such motor, also described in the hereinbefore referred to book, utilizes first and second axially displaced salient pole soft magnetic rotor elements having an axially disposed permanent magnet therebetween so that all salient poles on one rotor element are of one polarity, and all salient poles on the other rotor element are of opposite polarity. A pair of wound stators are provided, each aligned with one of the rotor elements. Each stator has a plurality of pole groups with a single winding for each pole group, and with all poles in all pole groups having the same pitch as the adjacent rotor element. As before, one stator is rotated with respect to its adjacent rotor element in comparison to the other stator-rotor element combinations. The back iron coupling the two stators allows the windings for one or more pole groups in a particular stator to be excited with one plurality, and a corresponding pole group on the other stator to be excited with the opposite plurality.

In essence, the foregoing device is similar to the device of U.S. Pat. No. 2,249,029, with the permanent magnet providing a biasing of the rotor element, and with the second stator rotor element combination providing a duplicate motor for the second pole of the bias magnet. Because of the bias magnet however, the torque provided by any one set of coils is dependent upon the polarity of the excitation provided, and accordingly, the number of excitation states is twice the number of coil sets.

BRIEF SUMMARY OF THE INVENTION

Improved step motors for providing linear and angular step-wise motion. In certain embodiments the motors utilize a permanent magnet rotor having a multiplicity of equal pitch (equally spaced) permanent magnetic poles of alternating polarity. The stator has a plurality of pole groups, each pole group having a plurality of poles of the same pitch or spacing as the rotor poles, with each stator pole group being displaced with respect to the other stator pole groups, whereby the poles in the pole groups will successively align with the poles in the rotor in a predetermined sequence upon successive incremental motion between the rotor and stator. Windings are provided on each stator pole group to selectively polarize the stator poles in the respective pole group in alternate polarity to encourage alignment of the nearest rotor poles therewith. The external electrical characteristics of the devices of the invention may be substantially the same as conventional permanent magnet stepper motors, and may be fabricated utilizing various numbers of phases as desired. Both linear and rotary devices are disclosed, and design considerations for physical symmetry, magnetic symmetry and numbers of phases are described. Permanent magnet embodiments disclosed include multiple permanent magnets making up the rotor poles, and a single permanent magnet having shaped pole pieces. A wound rotor embodiment is also disclosed.

DETAILED DESCRIPTION OF THE INVENTION

Figures 1, 3:
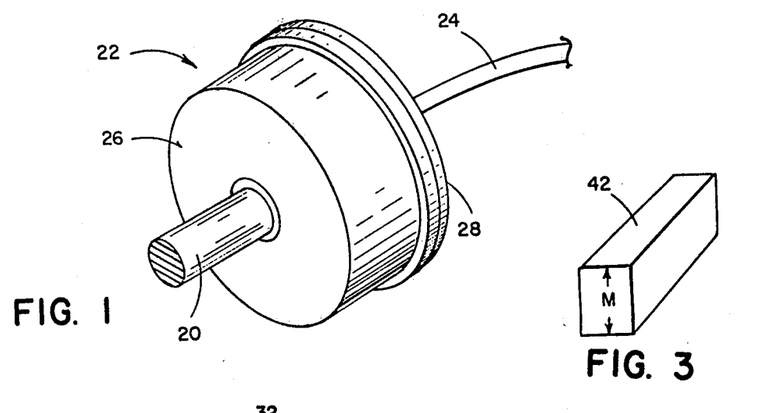
FIG. 1 is a perspective view of a typical stepper motor of the present invention.
FIG. 3 is a perspective of an individual magnet used in the rotor assembly of FIG. 1.

The present invention constitutes unique stepper devices which may be physically constructed in various forms, such as by way of example, rotary devices and linear devices. However, since rotary devices are perhaps the most commonly and widely used form of stepper motor, such a form of the present invention shall be described herein as representing the preferred embodiment thereof. Thus, FIG. 1 presents a perspective view of a rotary stepper motor (hereafter simply "stepper motor") embodying the principles of the present invention. The packaged stepper motor, as shown, is relatively conventional in exterior characteristics, being characterized by a centrally extending shaft 20, bearing supported on a housing assembly 22 and having a cable 24 containing a plurality of leads. The particular embodiment shown has a frame assembly 22 comprising principally a flanged housing member 26 carrying one bearing for the shaft 20, and base plate 28 carrying the second shaft bearing. Members 26 and 28 are fastened together by screws adjacent the periphery of plate 28, with the resulting flange region providing a suitable flange mount for the motor in an assembly in which it is used. As shall subsequently be seen, the motor electrically may be made to be the same as prior art stepper motors, so that conventional stepper motor drive circuitry may be readily used with the invention. Such circuitry, by way of example, is described in the book Theory and Applications of Step Motors previously referred to herein. The main distinguishing characteristic of the assembled motor of FIG. 1 is its characteristic pancake design, that is, a relatively short or thin motor assembly in the axial direction. It is important to distinguish this feature from the characteristics of prior art stepper motors, which generally utilize two or more wound stator assemblies displaced axially along a rotor assembly, thereby resulting in a relatively long assembly if substantial torque is to be provided, or in the alternative, characteristically having a large step angle so as to require substantial gear reduction. In the figures to follow which illustrate the geometric relationship of the rotor and stator, the rotors are generally illustrated with specific physical orientations with respect to the stators which do not necessarily correspond to the motor OFF and/or motor ON stable (cogging) positions.

Figure 2:
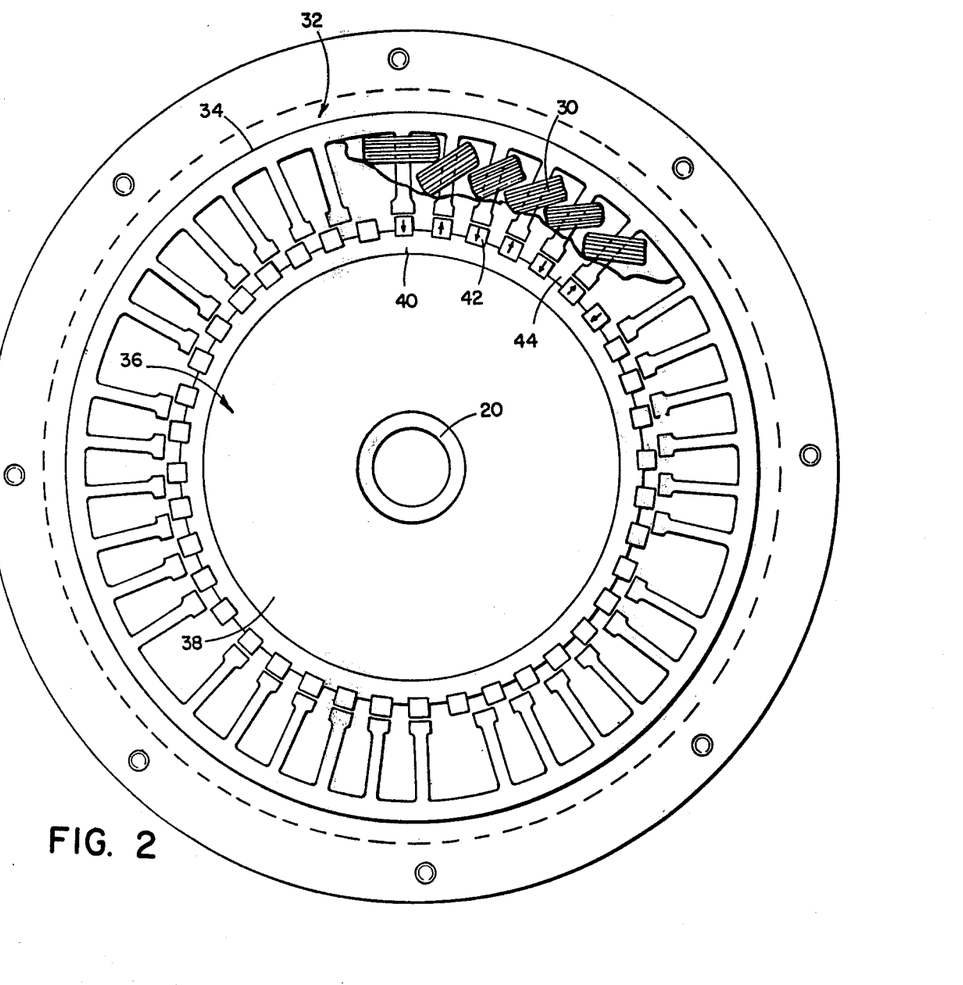
FIG. 2 is a cross section of the stepper motor of FIG. 1.

Now referring to FIG. 2, a rear view of the motor of FIG. 1 with the back plate 28 and rear bearing removed may be seen. In this figure only a portion of the winding 30 is shown so that the details of the stator stack may also be seen. (In the preferred embodiment the stator core comprises a stack of laminations of soft magnetic material fabricated in the conventional manner. Also as used herein the words "soft magnetic material" refer to the various well-known materials characterized by their relatively high permeability and relatively low retentivity, whereas the words "permanent magnets" and/or "permanent magnetic materials" refer to materials characterized by their relatively high retentivity, also normally having a relatively low permeability.) The stator stack, generally indicated by the numeral 32, is characterized by a relatively narrow ring of back iron 34 containing, in this embodiment, six pole groups each having a plurality of inward directed poles disposed adjacent the rotor, generally indicated by the numeral 36. It will be noted that each of the six pole groups contain an even number of poles, more specifically six poles in the embodiment shown, with each of the pole groups being equally spaced about the air gap circle in 60° increments.

The rotor 36, having a hub 38 and shaft 20, is characterized by a ring of soft magnetic material 40 supporting a plurality of equally spaced magnets 42 about its periphery. The magnets 42 are generally approximately axially aligned (physically, not magnetically) along the rotor adjacent the poles of the stator (though skewing may be used if desired). As may be seen in FIG. 2, the pitch or separation of the magnets is the same as the pitch of the poles of each pole group, though with the rotor in the position shown, only two pole groups, specifically diametrically opposed pole groups, are in alignment with the magnets 42. (In the preferred embodiment the region 44 between magnets is filled with a plastic material so that the outside diameter of the rotor, when ground, will be a generally uninterrupted cylindrical surface.)

Now referring to FIG. 2, a perspective view of an individual magnet 42 taken on an expanded scale may be seen. In particular the direction of magnetization of the magnets 42 is indicated in that figure, with the magnets being positioned on the rotor in alternate orientations so that the magnetic poles presented to the stator poles are of alternate polarity, e.g., north-south-north-south, etc.

Figure 4:
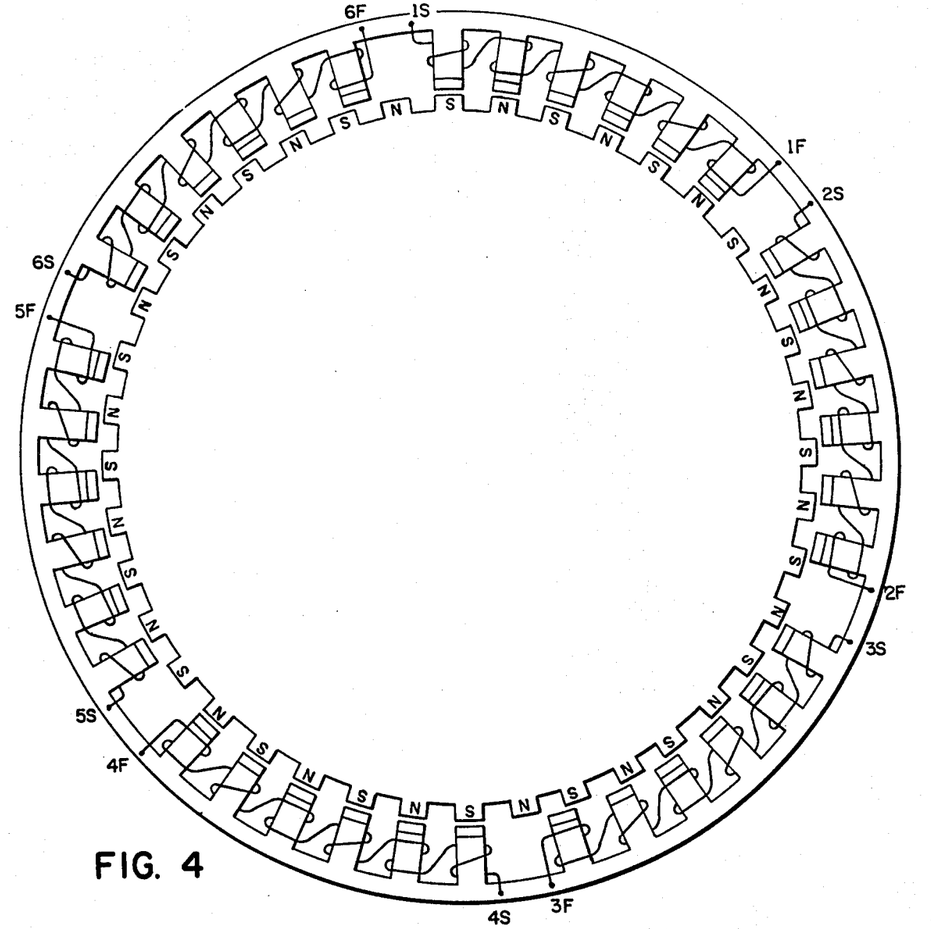
FIG. 4 is a schematic representation of the rotor stator combination of the embodiment of FIG. 1 illustrating the winding arrangement therein.
Figure 5:
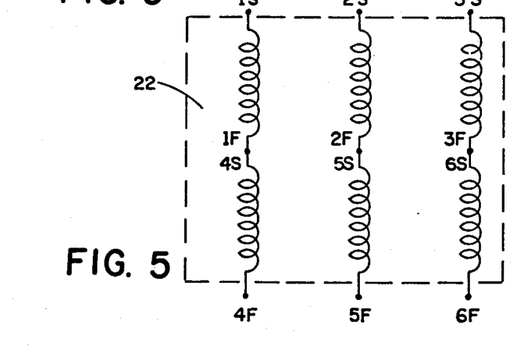
FIG. 5 is a schematic representation of the interconnection of the windings of FIG. 4.

Now referring to FIG. 4, a schematic representation of the rotor and stator of the stepper motor of the present invention showing the relative direction of the windings of the stator may be seen. It will be noted that within each pole group, adjacent poles are wound in the opposite sense, each with the same number of turns, so that current through the coils of any one pole group will create adjacent poles of opposite polarity within the pole group. Further, as shown in FIG. 5, the coils for diametrically opposed pole groups are connected in series within the stepper motor housing. Thus, the finish lead 1F for the coils for the first stator pole group is connected to (or integral with) the start 4S of the coils for the fourth pole group, with the start and finish leads 1S and 4F being brought out in cable 24. As may be seen in FIG. 5, this arrangement is repeated for coil sets 2 and 5, and 3 and 6, thereby providing six external leads to the cable 24. Such series connnections, however, are not a necessity, as a parallel winding, by way of example, may also be used as shown in the fragmentary view of FIG. 15. Also, the space between the pole groups of FIG. 5 may be occupied by an unwound pole, or for that matter an odd number of wound poles could be used for each pole group, as magnetic balancing would be achieved by the diametrically opposite odd number of poles in the other pole group of the same phase, providing an even number of stator poles for that phase. Such an arrangement is not preferred however, and in the lower limit is directly contrary to the teachings of the present invention, as individual, diametrically opposed stator poles avoid the advantages of the stator pole groupings of the present invention.

In the orientation shown in FIG. 4, it will be noted that two groups of rotor poles are generally aligned with the pole groups 1 and 4 on the stator, whereas the rotor poles adjacent stator poles 2 and 5 are displaced in one direction therefrom, and the rotor poles adjacent stator pole groups 3 and 6 are displaced in the opposite direction therefrom. Accordingly, the permanent magnets adjacent stator pole groups 2 and 5 encourage the rotor in one direction, and permanent magnets adjacent pole groups 3 and 6 encourage the rotor in the opposite direction, thereby providing a substantially zero net torque on the rotor. However, there is a relatively strong magnetic force encouraging the rotor to remain in the position shown as a result of the magnetic force on pole groups 1 and 4, thus providing a substantial magnetic locking of the rotor in the position shown, or a substantial magnetic cogging effect if the rotor is forceably rotated therefrom.

Figure 6:
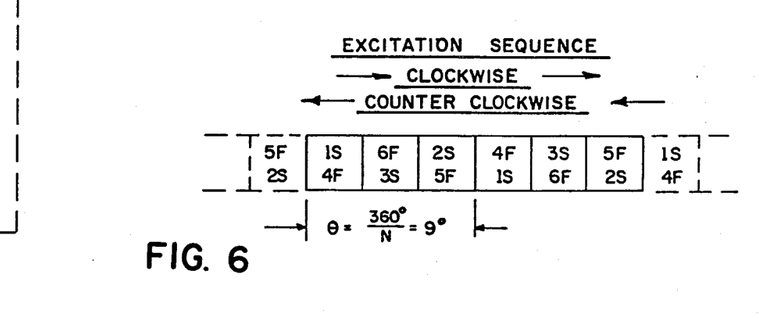
FIG. 6 is a diagram illustrating the stepping sequence of the stepper motor of the preceding FIGURES.

When a positive voltage is applied to terminal 1S with respect to terminal 4F, the poles in pole groups 1 and 4 are magnetized with polarities opposite the polarities of each of the adjacent rotor poles, and accordingly the rotor is firmly magnetically locked into the position shown. It will be noted that in this condition the rotor poles are displaced in clockwise direction one-third of a rotor pole pitch with respect to pole groups 2 and 5, and one-third of a pole pitch in the counter-clockwise direction with respect to pole groups 3 and 6. Thus as shown in FIG. 6, and for the winding sense shown in FIG. 4, a shift of the excitation from terminals 1S and 4F to terminals 6F and 3S will result in the magnetization of the stator poles for pole groups 3 and 6 so as to encourage the rotor to rotate in a clockwise direction by one-third the rotor pole pitch to align with the respective stator poles. Similarly, for rotation in the opposite direction by an angle equal to one-third the rotor pole pitch, the excitation may be shifted to terminals 5F and 2S.

By stepping the excitation in the sequence shown in FIG. 5 from left to right results in a clockwise rotation of the rotor (referenced to FIG. 4), with each step resulting in a 3° step of the rotor, whereas stepping the excitation in the sequence of FIG. 5 reading from right to left results in the stepping of the rotor in a counter-clockwise direction. Obviously the stepping sequence repeats itself, though it will be noted that effectively there are three externally available coil connections ("phases"), but are six excitation states for these three coil connections, as the permanent magnet rotor makes the device sensitive also to the polarity of the excitation.

Having now described the construction and operation of one embodiment of the invention, certain design considerations, some of which constitute requirements and others of which are merely expedients or conveniences, will not be described. Since the rotor poles alternate in polarity, an even number of rotor poles is used in a rotary device. Also, since the stator poles in any pole group must be magnetizable with polarities complimentary to the adjacent rotor poles in that pole group, generally an even number of poles in any stator pole group will be used. It should be noted that with this arrangement the back iron between poles in any stator pole group need only carry the flux of two rotor and stator poles, thereby minimizing the amount of back iron required and maximizing the air gap diameter for a given case size and enhancing the torque produced. As a matter of fact, the back iron need not even couple adjacent pole groups, or even couple more than two adjacent poles of opposite polarity within one pole group, though such an arrangement may alter the flux distribution somewhat. However, in most cases, it is most convenient to use a continuous back iron ring 34 (see FIG. 2) for angular location and positional stability of the overall stator assembly, and for production ease. In that regard, while two and three phase machines are perhaps most common, there is really no limit to the number of states that could be used, even one state for each stator pole pair. Obviously odd numbers of stator pole groups could be used.

The device described hereinbefore may be referred to as a three "phase" device, since effectively three sets of windings are accessible electrically through cable 24, each phase representing the series combination of the windings of two diametrically opposed pole groups. Such an arrangement provides a balance in the radial magnetic forces on the rotor, a result generally desirable with rotary electro-magnetic devices. Accordingly, there are six pole groups in this device, forming the three phases, with the polarity sensitivity of the device providing six excitation states (e.g., plus and minus states for each phase).

Thus for magnetic symmetry, it is preferred to provide diametrically opposed pole groups for each phase.

For a three phase machine, the stator poles for each of the other two phases are physically rotated with respect to the corresponding rotor poles by one-third and two-thirds of a rotor pole pitch, respectively, (or plus one-third and minus one-third of the rotor pole pitch, as a plus two-thirds and a minus one-third pitch rotation differs only in the winding sense or excitation polarity which must be used for the proper stepping of the device).

It will be noted that in the three phase device so far described, the stator further has a geometric symmetry in that the second stator pole group is physically displaced from the first pole group by exactly 60°; the third pole group is displaced from the first pole group by exactly 120°, etc. Such a geometric symmetry, though not required, is convenient and perhaps functionally desirable. This physical symmetry of the stator assembly provides specific limitations on the number of rotor poles which may be used. In particular, for the three phase machine shown, there must be $n \pm \frac{1}{3}$ rotor poles in each 60°, or $N = 6n \pm 2$, where n is an integer, and N is the number of rotor poles. Thus for stator pysical symmetry in a three phase device having magnetic symmetry by diametrically opposed pole groups within the same phase, the number of rotor poles which may be used include, by way of example, 22, 26, 28, 32, 34, 38, 40, 44, 46, 50, etc. (The lowest number of rotor poles satisfying the foregoing requirement is 4, which provides a configuration having only single diametrically opposed poles for any stator "phase", a configuration not in keeping with one of the concepts of the present invention, that is, stator pole groups having within each pole group an even number of poles, wound to provide alternate polarities on adjacent poles within the group.) The specific embodiment hereinbefore described has forty rotor poles, thus providing the physical symmetry in the stator. It should be noted, however, that similar devices may be fabricated using some other even number of rotor poles, such as by way of example, a device very similar to that hereinbefore described but using thirty-six rotor poles. Such a device, however, will have stator poles which cannot be disposed exactly 60° with respect to each other in order to obtain the plus or minus one-third pole pitch displacement required for uniform stepping.

It should be noted that if the radial magnetic force need not be balanced, a three phase machine may use stator pole groups repeating every 120°. Thus, within any 120° the number of rotor poles must be $n \pm \frac{1}{3}$ or $N = 3n \pm 1$ for the full 360°. Since a number of rotor poles N must be an even number, n must be an odd number; and for a practical system the available selections for the number of rotor poles is the same as for the magnetically balanced system.

By way of further example of the foregoing, if a two phase machine (four electrical states) is desired having the magnetic balancing or symmetry, and also having a physically symmetrical stator stack, the stator pole groupings must repeat every 90° (e.g., repeat four times), with the number of rotor poles within a 90° segment = $n \pm \frac{1}{2}$. Thus, $N = 4n \pm 2$, which gives allowable rotor pole numbers such as 34, 38, 42, 46, 50, etc.

Figure 7:
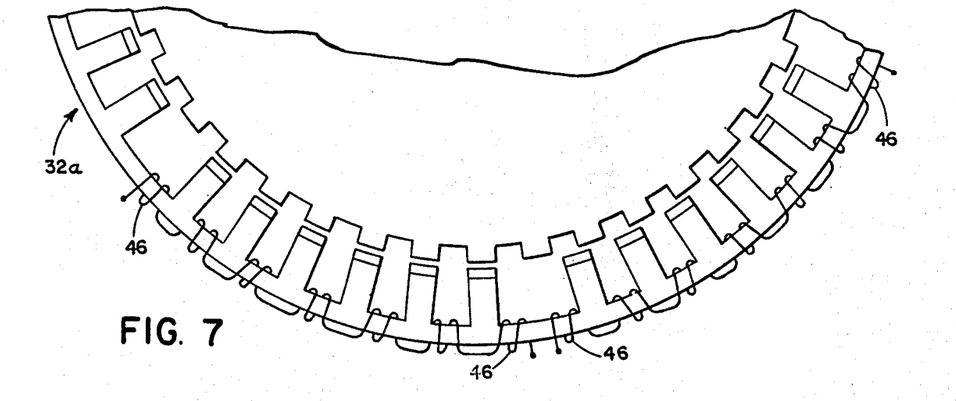
FIG. 7 is a diagram similar to FIG. 4 illustrating an alternate winding form.

Now referring to FIG. 7, an alternate form of winding may be seen. In particular, this figure schematically illustrates a toroidal winding for the stator assembly 32a, a technique generally well-known in the prior art of electromagnetic omponents. A toroidal winding, however, has one difference which should be noted. Specifically, an odd number of coils are provided for an even number of stator poles. Accordingly, if the same number of turns is used on each coil, there is a net circumferential MMF resulting from any one stator pole group. Though this net MMF does not cause any particular problem if the net for all pole groups in each phase is zero, and in fact may add to the damping of the rotor, it may be eliminated if desired by providing the end coils 46 in each stator pole group with half the number of turns of the intermediate coils.

Figure 8:
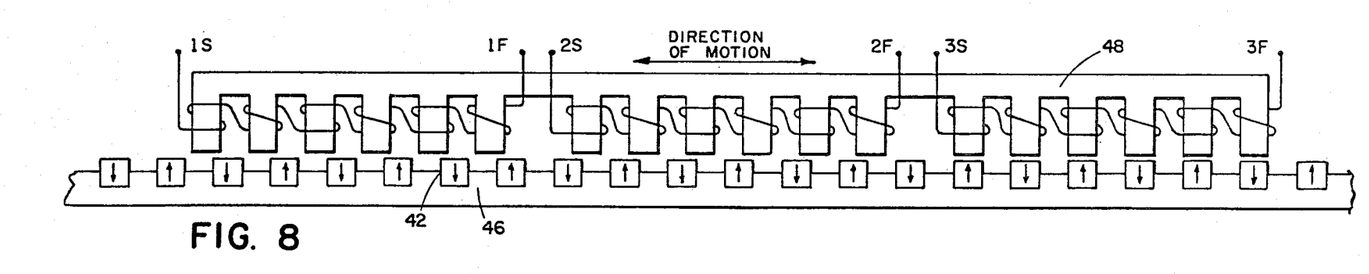
FIGS. 8 and 9 are schematic illustrations of two forms of linear stepper motors utilizing the concepts of the present invention.
Figure 9:
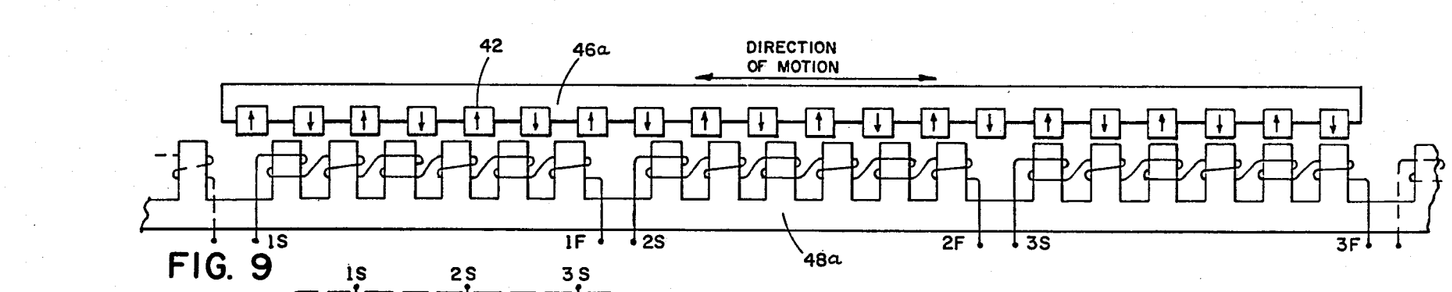

Now referring to FIGS. 8 and 9, exemplary schematic diagrams of two linear motors utilizing the present invention may be seen. The general principle of operation of these two motors is the same, though one utilizes a "stator assembly" of limited extent and a "rotor assembly" extending over the full length of travel of the motor, whereas the other utilizes a rotor assembly of limited extent and a stator assembly extending over the full range of travel. Thus in the embodiment of FIG. 8, a rotor assembly comprising a soft magnetic back iron member 46 having a plurality of magnets 42 of a given linear pitch (spacing) and of alternate polarities is provided. This rotor assembly extends over the length of the travel desired, or more appropriately the length of travel desired plus at least one stator length so that the rotor and stator remain in a cooperative disposition throughout the length of travel. The stator assembly is similar to the stator assemblies hereinbefore described, particularly with respect to FIGS. 2 and 4, in that a common soft magnetic core defines three pole groups, each having six poles in each group, with each pole group being wound to provide poles of alternating polarity within each pole group. Further, each pole group is displaced one-third of the rotor pole pitch to provide the desired stepping action by sequentially stepping the excitation through the three windings (and of course with reverse polarities also to provide six states as in the previously described embodiment). The embodiment of FIG. 9 is similar, though the pole group pattern of the stator is repeated, typically with the windings of every third pole group being coupled together, and with the rotor spanning three pole groups so as to always be adjacent one of the excited pole groups. Of course, in either of these embodiments, the "rotor", that is the portion of the device carrying the permanent magnets, may be the movable member, or alternatively the wound "stator assembly" may be the movable element, independent of which is the larger element. Similarly, while the embodiments of FIGS. 8 and 9 have been described with respect to a linear device suggesting a flat pole surface, the rotor and stator assemblies may be of other configurations such as circular, with FIGS. 8 and 9 representing a cross-section showing the air gap at a plane extending through the axis of the device. Furthermore either of these devices may be extended to a two dimensional drive by using square (or rectangular) poles on the rotor and stator assemblies and extending each to the second dimension in accordance with the schematic representations of either FIG. 8 or FIG. 9.

Figures 10, 11, 12:
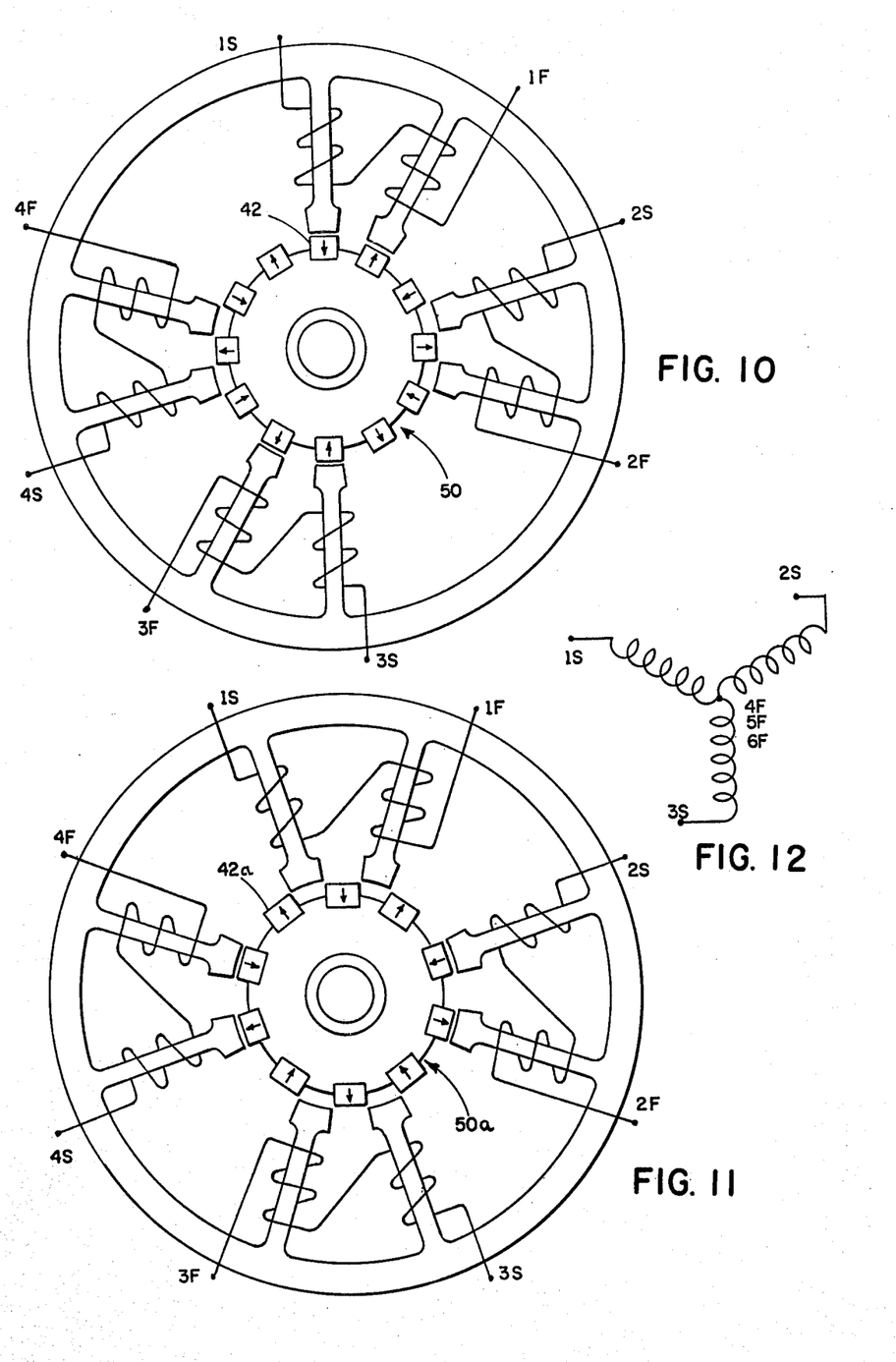
FIG. 10 is a schematic representation of a two phase nonsymmetrical stator stepper motor.
FIG. 11 is a schematic representation of a two phase symmetrical stator stepper motor.
FIG. 12 is a schematic illustrating a wye connection for a three phase stepper motor such as that described with respect to FIGS. 1 through 5.

Now referring to FIG. 10, an alternate embodiment representing one of the simpler forms of the present invention for rotary devices may be seen. In this embodiment each pole group is comprised of two poles, with diametrically opposed pole groups being coupled in series to provide for the balancing of the radial magnetic forces (e.g., finish lead 1F being coupled to finish lead 3F so that excitation is between 1S and 3S for the first phase, etc.). It will be noted that the second and fourth pole groups are not disposed 90° away from the first and third pole groups respectively, but are disposed at an angle other than 90° thereby making the stator unsymmetrical in comparison to the stator of FIG. 2. It will also be noted that there are twelve magnets 42 on the rotor assembly, generally indicated by the numeral 50. For a two-phase device, it was previously indicated that a symmetrical stator could be used if the number of rotor poles was in accordance with the equation: $N=4n\pm2$, where n is an integer. Accordingly, $N=12$ does not satisfy that equation, thereby giving rise to the unsymmetrical stator. Thus the embodiment of FIG. 10 is an example of a two-phase device (four excitation states) having a magnet symmetry but a geometric assymmetry in the stator assembly. (By simply changing the number of rotor poles to ten as shown in FIG. 11, and reproportioning the assembly accordingly, a two pole device having a physically symmetrical stator is achieved.)

There has been described herein in detail various embodiments of the present invention, including two and three phase rotary devices having physically symmetrical and physically unsymmetrical stator assemblies, and two forms of linear devices. In the preferred embodiment high energy permanent magnets are used in the rotor, with individual magnets being cemented to a rotor assembly as indicated in the various embodiments herein.

Figures 13, 14, 15:
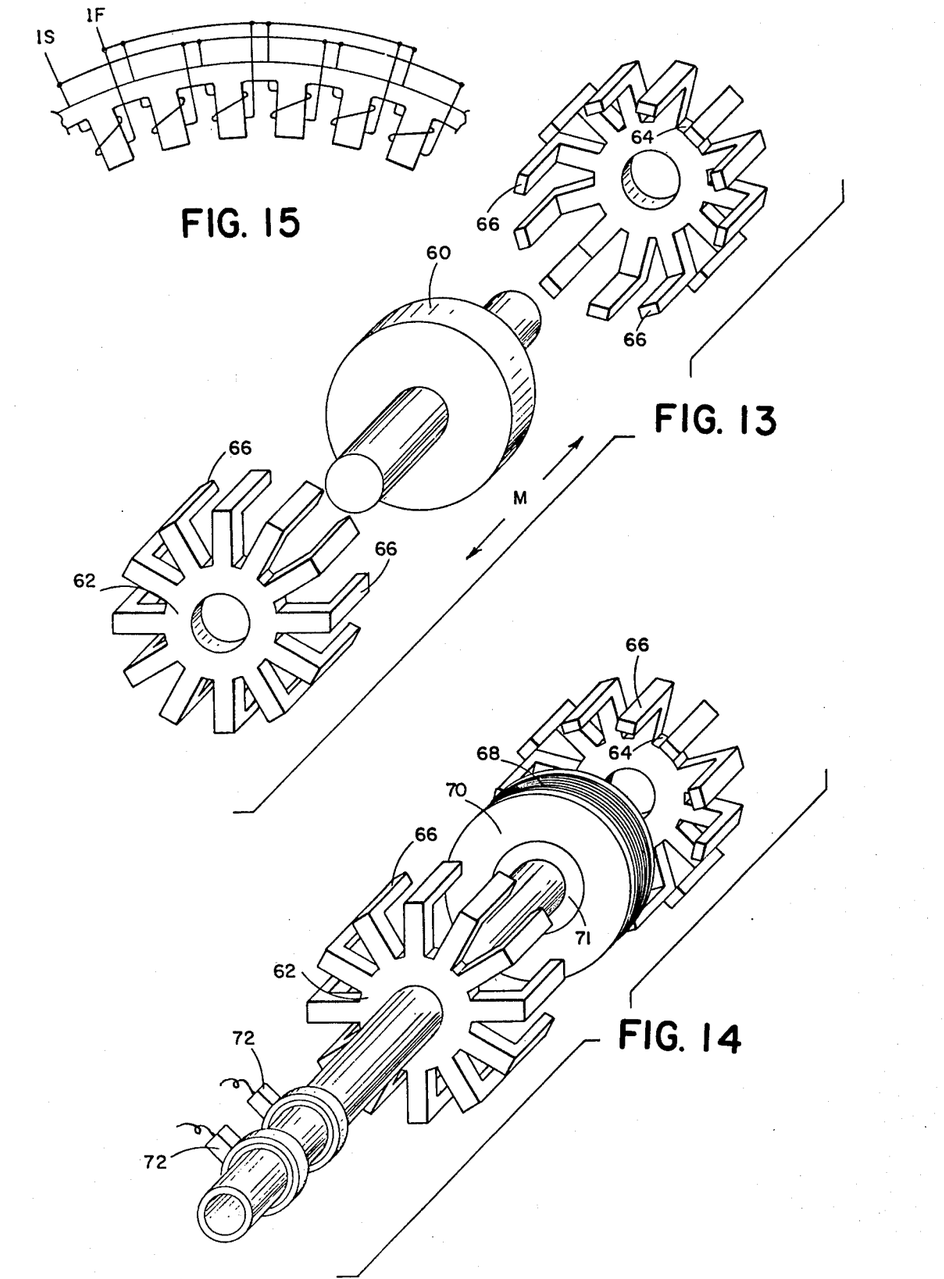
FIG. 13 is an exploded perspective view of an alternate single permanent magnet rotor which may be used with the stepper motor embodiment of FIG. 10.
FIG. 14 is an exploded perspective view of a further alternate wound rotor which may be used with the stepper motor embodiment of FIG. 10.
FIG. 15 is a segment of a stator showing the parallel connection of stator pole windings in a stator pole group.

The coplanar arrangement of the stator pole groups allows the fabrication of pancake type devices to provide maximum torque in the shortest possible length (the word "coplanar" as used herein is used in the general sense to mean that the various poles or pole groups are generally arranged in the same axial position, rather than being stacked one behind the other as in many prior art permanent magnet stepper motors utilizing two or more stacked stator assemblies). Of course the present invention may also be utilized to provide steps of very small angular extent by providing additional stator assemblies, one behind the other, and angularly offsetting each slightly so as to provide additional excitation states to subdivide the effective angular steps of any one stator assembly. However, where applications allow, the simple coplanar arrangement utilizing a common back iron ring provides the best mechanical simplicity providing a highly efficient and compact stepper motor. (As used herein the words "back iron" are used in the general sense to denote an integral interconnecting soft magnetic core mechanically coupling all of the stator poles.) It should be understood that while two and three phase embodiments have been described in detail herein, the invention is not so limited, and may be readily extended to any larger number of phases so as to further subdivide the stepping angles. Similarly, a "rotor assembly" may simply constitute a single permanent magnet body magnetized to provide the desired multiple pole arrangement, or a soft magnetic rotor having poles wound and excited to provide the desired multiple pole arrangement. Examples of one type of single permanent magnet rotors and wound rotors may be seen in FIGS. 13 and 14. In FIG. 13 the multiplicity of equal pitch (equally spaced) magnetic poles is produced by one or more magnets 60 sandwiched between the soft magnetic pole pieces 62 and 64. The pole pieces 62 and 64 are configured equal numbers of projecting segments or teeth 66 so that when they are assembled with the magnet 60 sandwiched between them, the segments 66 of each pole piece 62 and 64 are interlaced with approximately equal spacing. With the magnet 60 polarized North-South along its axis (the shaft axis), it may readily be seen that the segments of one of the pole pieces 62 are magnetized to one polarity while the segments of the other pole piece are magnetized to the opposite polarity. In this manner, alternate magnetic poles occur at the rotor interface in the same manner as the other embodiments of the invention utilizing individual magnets. In FIG. 14 the same result is achieved using a single winding 68 in a plastic bobbin 70 disposed on a soft magnetic member 72 coupling the two pole pieces 62 and 64. Electrical connections for the winding 68 may be brought out through conventional slip ring assemblies 72 illustrated schematically in the figure. By exciting the coil 68 with a DC current the desired alternating rotor poles are obtained (actually, this configuration as well as other wound rotor configurations could operate on AC excitation, the stepping of course being dependent not upon the frequency of the AC excitation used but upon the stepping of the excitation in the same manner as the previously described embodiments).

Also while the lead and excitation scheme for the embodiment of FIGS. 1 through 4 was illustrated in an exemplary manner in FIGS. 5 and 6, it is to be understood that other lead arrangements and excitations may readily be used. By way of specific example, in a three phase device the three phases may be coupled as shown in FIG. 12, with only the three start leads being brought out. This type of connection still provides six states, as any one lead is driven with respect to the other two leads. By way of example, with 1S and +V and 2S and 3S both at ground the first phase is excited, with the other two phases each having an excitation of one-half of that of the first phase. Though both phase 2 and phase 3 result in a torque on the rotor, it may be shown that these two torques are in opposite directions, thereby effectively cancelling each other, yielding a net torque caused only by the excitation of the first phase. The advantage of such a connection, however, is that the excitation of phases not resulting in driving torques still results in damping of rotor motion, minimizing overshoot and settling time problems. Of course any other of various well known connections and excitation arrangements may also be used, as the general behavior of the devices of the present invention in terms of excitation and dynamics is similar to those of the prior art.

By way of example, the winding connections shown in FIGS. 4, 7, 8 and 9 illustrate individual coils within a phase connected in series, which is convenient for the majority of applications. Series connection of the coils is not essential to the invention however. Specifically, referring to FIG. 15 showing a schematic representation of a portion of the stator of a stepper motor in accordance with the present invention, a parallel connection of individual coils within a pole group may be seen. The coils within a pole group may also be connected in numerous series-parallel combinations with no effect on the operational mode of the invention. The optional parallel or combination series-parallel coil connection is also applicable to the alternate winding form shown in FIG. 7, the linear motor embodiments shown in FIGS. 8 and 9, and in the 2 phase, 4 state embodiment shown in FIG. 10. Thus while the preferred embodiment and various alternate embodiments of the present invention have been disclosed and described in detail herein, it will be understood by those skilled in the art that various changes in form and detail may be made therein without departing from the spirit and scope of the invention.

I claim:

1. A motor for encouraging relative motion between a rotor assembly and a stator assembly comprising:
   a rotor assembly presenting at a rotor surface a plurality of rotor poles equally spaced at a predetermined pitch, each said pole having the opposite polarity of the immediately adjacent rotor poles;
   a stator assembly presenting a plurality of pole groups adjacent said rotor surface, each of said pole groups having an equal plurality of poles with the same pitch as said poles on said rotor assembly, said pole groups being staggered adjacent said surface of said rotor so that when said poles in any of said pole groups is aligned with the adjacent said poles of said rotor assembly, said poles in adjacent said pole groups are offset from said poles on said rotor assembly by a fraction of said predetermined pitch of said rotor poles, said fraction being any ratio of two unequal integers such that the product of said fraction and a predetermined number of said pole groups is an integer, whereby said pole groups are equally spaced adjacent said rotor surface; and
   means for controllably polarizing said plurality of poles in any of said plurality of pole groups so that adjacent poles in the respective said pole groups have different polarity.

2. The motor of claim 1 wherein all of said pole groups are substantially coplanar.

3. The motor of claim 1 wherein said rotor surface is a flat surface.

4. The motor of claim 1 wherein said rotor surface is a cylindrical surface.

5. The motor of claim 4 wherein said stator assembly is a substantially coplanar assembly.

6. The motor of claim 5 wherein the number of said pole groups is an even number.

7. The motor of claim 5 wherein the number of poles in each pole group is the same number, exceeding two.

8. The motor of claim 7 wherein each of said pole groups of said stator assembly has an associated diametrically opposite pole group and said means for controllably polarizing said plurality of poles in any of said plurality of pole groups comprises means for controllably polarizing said plurality of poles in diametrically opposed pole groups have different polarity.

9. The motor of claim 8 wherein said stator assembly has four pole groups, and wherein said rotor assembly has $4n \pm 2$ poles, where n is an integer.

10. The motor of claim 8 wherein said stator assembly has six pole groups and said rotor assembly has $6n \pm 2$ poles, where n is an even number.

11. The motor of claim 5 wherein all of said poles in all of said pole groups are integral with a back iron ring of soft magnetic material.

12. The motor of claim 11 wherein said means for controllably polarizing said plurality of poles in any of said plurality of pole groups comprises windings on each of said poles.

13. The motor of claim 11 wherein said means for controllably polarizing said plurality of poles in any of said plurality of pole groups comprises toroidal windings on the back iron between poles.

14. The motor of claim 1 wherein said rotor assembly comprises a generally cylindrical rotor assembly having a plurality of individual permanent magnets magnetized in a radial direction, each supported adjacent its inner surface by a soft magnetic member and extending outward to the rotor surface.

15. The motor of claim 1 wherein said rotor assembly comprises at least one permanent magnet and first and second pole pieces, said permanent magnet presenting north and south poles on first and second magnet surfaces thereof, said first and second pole pieces being coupled to said first and second magnet surfaces and each having a plurality of pole faces interfitting with the pole faces of the other to define a plurality of alternating poles at said surface of said rotor.

16. The motor of claim 15 wherein said motor is a rotary device having a shaft supported rotor assembly for rotation about the axis of said shaft, and wherein said at least one permanent magnet is magnetized in a direction substantially parallel to said shaft axis, said plurality of pole faces of each of said pole pieces projecting in a direction parallel to and radially spaced from said shaft axis to define a substantially cylindrical rotor surface.

17. The motor of claim 1 wherein said rotor assembly comprises at least one winding surrounding a soft magnetic core, said soft magnetic core including first and second pole members on the ends thereof, each said pole member having a plurality of pole faces interfitting with the pole faces of the other to define a plurality of poles at said surface of said rotor polarizable with opposite polarity by a current in said at least one winding.

18. The motor of claim 17 wherein said motor is a rotary device having a shaft supported rotor assembly for rotation about the axis of said shaft, and wherein the axis of said at least one winding is substantially concentric to said shaft axis, said plurality of pole faces of each of said pole pieces projecting in a direction parallel to and radially spaced from said shaft axis to define a substantially cylindrical rotor surface.

19. The motor of claim 1 wherein said stator assembly is a one piece stator assembly.

20. An electromechanical device for encouraging relative rotation between a rotor assembly and a stator assembly comprising:
   a rotor assembly presenting on a rotor surface an even plurality of rotor poles equally spaced at a predetermined angular pitch, each of said rotor poles having an opposite polarity from the poles immediately adjacent thereto;
   a stator assembly presenting a plurality of pole groups, adjacent said rotor surface, each of said pole groups having an equal plurality of stator poles disposed adjacent said rotor surface, said stator poles within any one said pole group having the same angular pitch as said poles on said rotor assembly, each of said pole groups being displaced from the adjacent said pole groups by a fraction of said predetermined pitch of said rotor poles, said fraction being any ratio of two unequal integers such that the product of said fraction and the number of said pole groups is an integer, whereby said pole groups are equally spaced about said rotor surface; and
   means for controllably polarizing each of said pole groups so that adjacent said stator poles within the selected said pole groups are polarized in opposite polarity.

21. The device of claim 20 wherein all of said stator pole groups are substantially coplanar.

22. The device of claim 21 wherein the number of said pole groups is an even number.

23. The device of claim 20 wherein the number poles in each group is the same number exceeding two.

24. The device of claim 23 wherein said means for controllably polarizing said plurality of poles in any of said plurality of pole groups comprises means for controllably polarizing said plurality of poles in diametrically opposite pole groups so that adjacent poles in each of said diametrically opposed pole groups have different polarity.

25. The device of claim 24 wherein said stator assembly has four pole groups, and wherein said rotor assembly has $4n \pm 2$ poles, where n is an integer.

26. The device of claim 24 wherein said stator assembly has six pole groups and said rotor assembly has $6n \pm 2$ poles, where n is an even number.

27. The motor of claim 26 wherein said means for controllably polarizing said plurality of poles in any of said plurality of pole groups comprises windings on each of said poles.

28. The motor of claim 27 wherein said means for controllably polarizing said plurality of poles in any of said plurality of pole groups comprises toroidal windings on the back iron between poles.

29. The motor of claim 20 wherein said rotor assembly comprises at least one permanent magnet and first and second pole pieces, said permanent magnet presenting north and south poles on first and second magnet surfaces thereof, said first and second pole pieces being coupled to said first and second magnet surfaces and each having a plurality of pole faces interfitting with the pole faces of the other to define a plurality of alternating poles at said surface of said rotor.

30. The motor of claim 29 wherein said motor is a rotary device having a shaft supported rotor assembly for rotation about the axis of said shaft, and wherein said at least one permanent magnet is magnetized in a direction substantially parallel to said shaft axis, said plurality of pole faces of each of said pole pieces projecting in a direction parallel to and radially spaced from said shaft axis to define a substantially cylindrical rotor surface.

31. The motor of claim 20 wherein said stator assembly is a one piece stator assembly.

* * * * *